(12) United States Patent
Tabone et al.

(10) Patent No.: US 7,913,732 B2
(45) Date of Patent: Mar. 29, 2011

(54) TIRE INSERT ATTACHMENT APPARATUS

(75) Inventors: Charles Tabone, North Tonawanda, NY (US); Larry Stuck, Amherst, NY (US); Gérard Tavin, Angers (FR); Paul Ardovini, West Seneca, NY (US)

(73) Assignee: Hutchinson SA, Paris (FR)

( * ) Notice: Subject to any disclaimer, the term of this patent is extended or adjusted under 35 U.S.C. 154(b) by 1288 days.

(21) Appl. No.: 11/451,742

(22) Filed: Jun. 13, 2006

(65) Prior Publication Data

US 2007/0284025 A1    Dec. 13, 2007

(51) Int. Cl.
*B60C 17/00* (2006.01)
*B60C 17/04* (2006.01)

(52) U.S. Cl. .................. 152/152; 152/516; 152/520
(58) Field of Classification Search ............ 152/516, 152/520
See application file for complete search history.

(56) References Cited

U.S. PATENT DOCUMENTS 4,883,104 A * 11/1989 Minami ................. 152/210
2003/0160501 A1 * 8/2003 Lust ...................... 301/11.2

* cited by examiner

*Primary Examiner* — Justin Fischer
(74) *Attorney, Agent, or Firm* — Reed Smith LLP

(57) ABSTRACT

A tire insert attachment apparatus includes a pin attached to a first part of the insert and extending into a second part of the insert to engage an actuator that draws the bolt into the second part. The actuator includes a tool engagement head that transmits rotational motion of a tool to a translator via a converter, the converter transforming the rotational motion of the head into linear motion imparted on the translator. The translator can be a rack and pinion setup or can be a thread arrangement. Preferably, the head rotates a worm, which rotates a pinion that has threads formed on an inner surface and engaging mating threads on the pin, the pin taking the form of a bolt, such as an eyebolt.

15 Claims, 6 Drawing Sheets

TIRE INSERT ATTACHMENT APPARATUS

BACKGROUND AND SUMMARY

"Runflat" tire inserts are devices that allow vehicles to continue operation after one or more pneumatic tires have been deflated. The inserts are installed snugly against the wheel and within a tire mounted on the wheel to keep the deflated tire stable and/or to distribute load on the wheel while keeping the wheel rims off the ground, preventing rim damage while substantially maintaining mobility and control. While most tire inserts have limited range at speed, they are typically designed to allow the vehicle on which they are installed to get far enough away from the point at which deflation occurred to get help or at least get out of danger. Additionally, some tire inserts can redirect explosive forces to reduce damage to a vehicle should it drive over an explosive device, such as a land mine or the like. Inserts improperly installed are more likely to fail during deflated tire operation or even during normal operation of the vehicle on which the wheel is installed. Proper installation is thus very important to the proper function runflat tire inserts, but because of their structure and where they are located, proper installation can be difficult and time consuming.

A typical runflat tire insert for single piece wheels is substantially toroidal and has at least one break therein to allow the inserts to be slipped onto a wheel. Some inserts have two or more sections separated by breaks, while others have one section that stretches open at a single break. In all of these incarnations, the sections of the insert must be connected and drawn together over the break(s) by attachment apparatus to ensure that the insert stays in its designated configuration. Because the inserts are installed in the tire cavity, they must be installed after at least partial tire installation, hindering access to the insert and attachment apparatus. The difficulty associated with insert installation, then, arises from maneuvering parts and tools around, under, and within the tire. To add to these difficulties, the various designs of attachment apparatus that have been employed in tire inserts sometimes require that mating insert components be manufactured with very tight tolerances to insure proper assembly and function at normal rotational speeds of wheels.

An example of a prior art solution is shown in U.S. Pat. No. 5,626,696, which incorporates a screw and nut turn buckle type connection between two half rings of the device. However, other prior art apparatus, such as those of U.S. Pat. Nos. 4,270,592 and 3,976,114, incorporate combinations of positional retaining member "hook and ratchet" or "plug and socket" arrangements. These combinations typically require separate engagement and disengagement devices to activate the fasteners. Additional prior art apparatus are shown, for example, in U.S. Pat. No. 4,393,911, which employs axial bolting members with limited adjustability, and in U.S. Pat. No. 4,391,317, which uses circumferential bolting members that are difficult to access inside of tire cavities. All of these prior art solutions still suffer from cumbersome, laborious installation and, in some cases, parts that must be installed from outside the wheel/tire/insert assembly. There is thus a need for an attachment apparatus that allows easier access and operation to speed and ease the installation process for inserts There is also a need for tire inserts that eliminate separate components to accomplish such installation.

Embodiments comprise a new attachment apparatus used in assembling, adjusting, and disassembling runflat tire inserts that includes all parts required for proper installation. Embodiments include an actuator more easily accessed from outside the tire and more easily operated by virtue of its orientation and construction. The actuator comprises a nut, bolt head, or the like accessible with a tool when a tire is mounted on the wheel for work with the inserts. The actuator can be attached to a mechanical assembly that converts rotation of the head into motion of parts of the insert toward or away from each other, depending on the direction of actuator rotation. For example, a gear and/or pinion can be used in the actuator. A preferred embodiment employs a worm and a pinion mounted in one part of an insert and a pin or the like, such as an eyebolt, mounted in another part with its shaft protruding toward the first half. Threads on the shaft of the eyebolt in preferred embodiments engage the pinion, such as via corresponding threads on the pinion's internal surface. The worm can be turned to rotate the pinion, which moves the bolt along its axis via the threads, which moves the parts of the insert together or apart, depending on which direction the worm is rotated. Other embodiments employ a rack and pinion arrangement and a threaded anchor. Embodiments can also include a locking feature to ensure that the actuator is fixed in position once assembly is complete.

DESCRIPTION OF THE DRAWINGS

Embodiments will be described with reference to the accompanying FIGS. in which like reference numerals refer to like parts.

DETAILED DESCRIPTION

Figure 1:
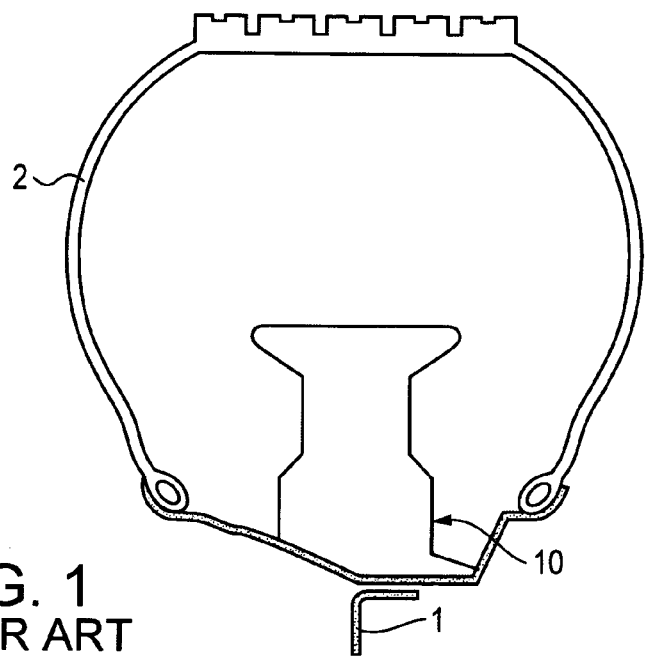
FIG. 1 is a cross-sectional schematic view of a typical tire insert mounted on a wheel and within a tire.
Figure 2:
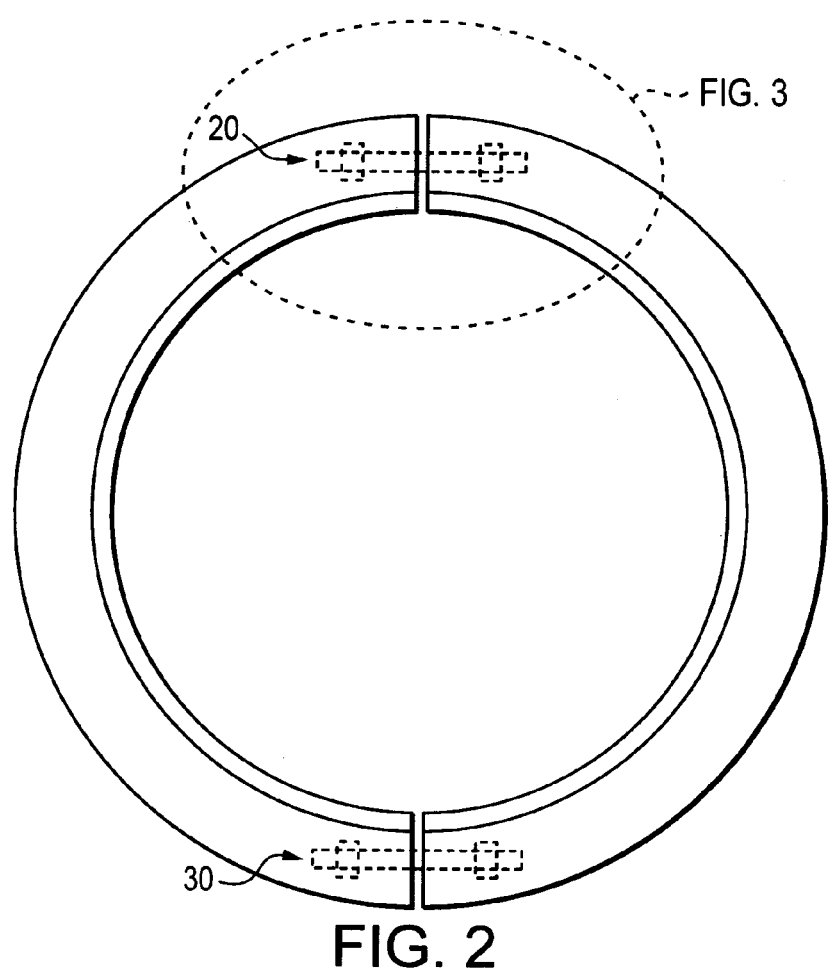
FIG. 2 is a schematic side view of an insert in which embodiments can be employed.
Figure 3:
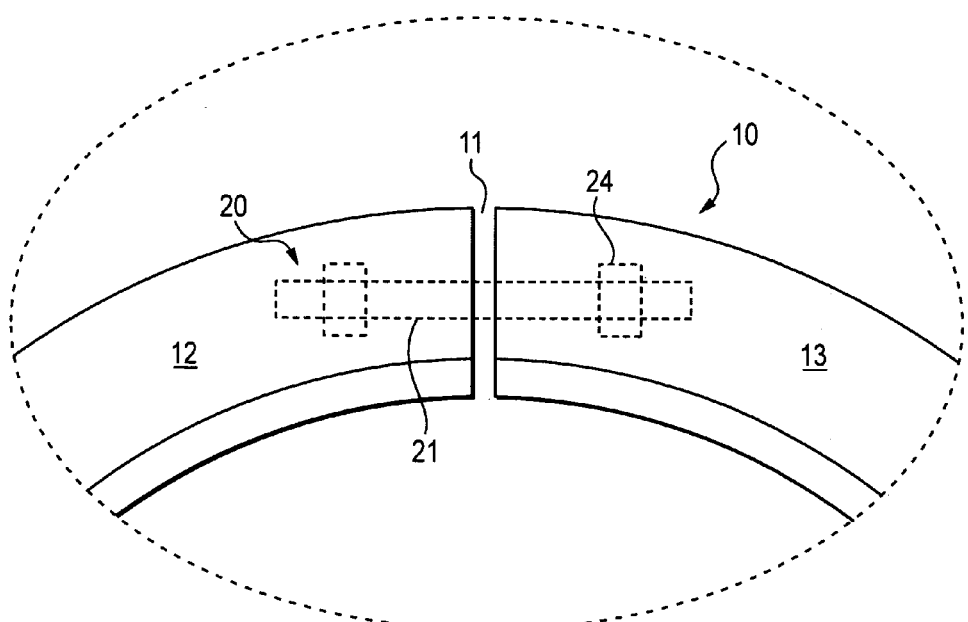
FIG. 3 is a close-up of the insert of FIG. 2 as indicated by the box labeled, "3".

As seen in, for example, FIG. 1, a runflat tire insert 10 is mounted on a wheel 1 and within a tire 2. Preferably, the insert includes a roller 10a that rides on a runner 10b mounted about the wheel 1. FIG. 2 shows a side view of an insert 10 that has two breaks 11 between first and second portions 12, 13 of the insert, an attachment apparatus 20, and a static connection assembly 30. It should be noted that the connection assembly 30 could be replaced with a second attachment apparatus 20. The one or more breaks 11 in the insert allow it to be placed on the wheel, and the attachment apparatus 20 at at least one break 11 allow the insert 10 to be tightened about the wheel 1. As seen in FIGS. 3-7, the attachment apparatus 20 broadly comprises a pin 21, a translator 22 that acts on the pin 21 to tighten/loosen the insert 10 about the wheel, and an actuator including a head 23 that can be rotated by a tool, and a converter 24 that takes rotation of the head 23 and transfers it into motion the translator 22 can use. Rotating the head 23 causes the converter 24 to act on the translator 22, which draws the pin 21 into or moves the pin out of the portion of the tire insert into which it projects, depending on the direction of head rotation. The particular locations of these components in the parts of the insert can be changed as long as the components accomplish the functions they must to draw the portions together and secure the insert. In embodiments, the head 23 and the converter 24 comprise an actuator mounted in the second portion 13 of the insert that is mechanically connected to and end of the pin 21 in the second portion 13, and can be selectively operated by a tool or the like, while the other end of the pin is anchored in the first portion 12.

Figure 4:
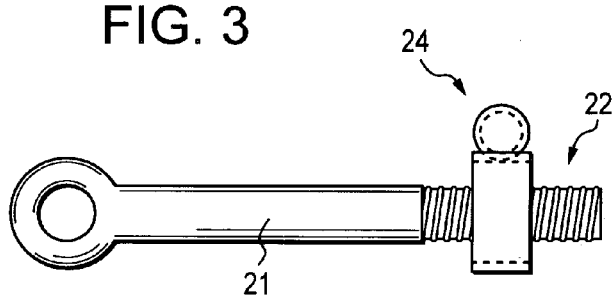
FIG. 4 is a schematic representation of a preferred embodiment.
Figure 7:
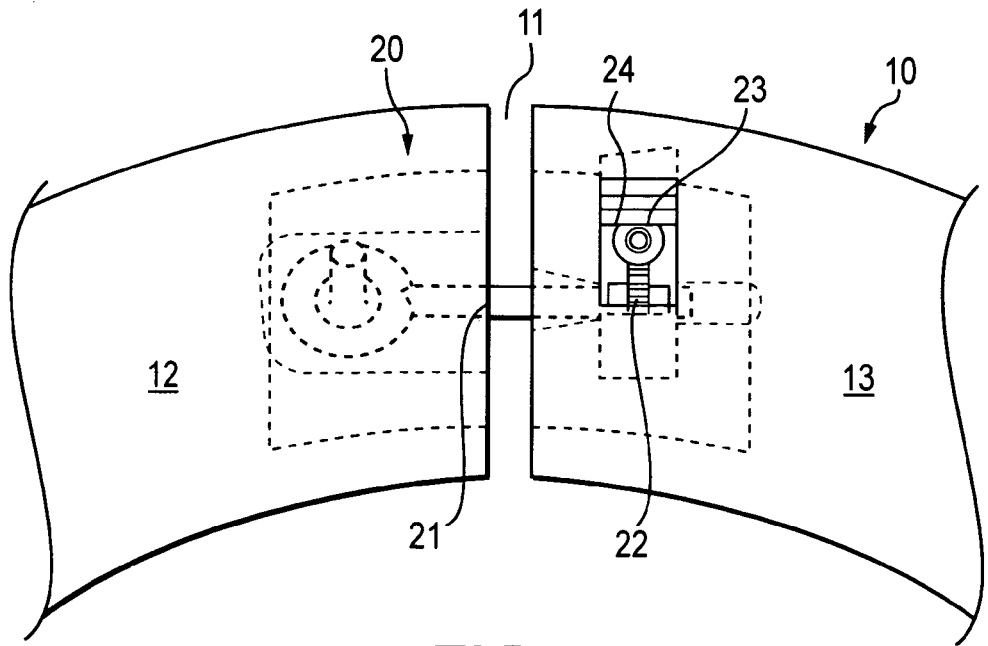
FIG. 7 see-through perspective view of an attachment apparatus according to embodiments at a break in a tire insert taken along the axis of rotation of a head of the apparatus.
Figure 8:
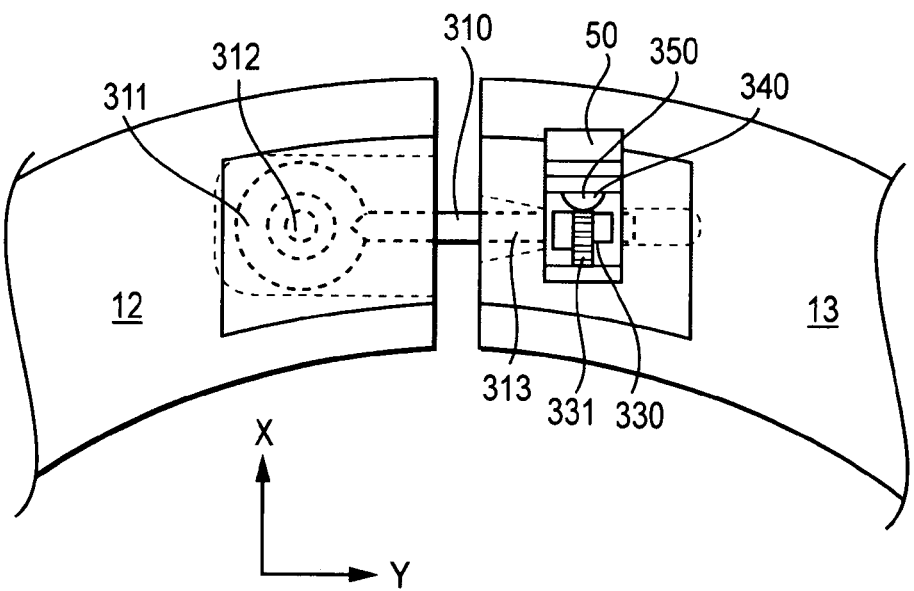
FIG. 8 is another schematic see-through perspective view of an attachment apparatus according to embodiments at a break in a tire insert.
Figure 9:
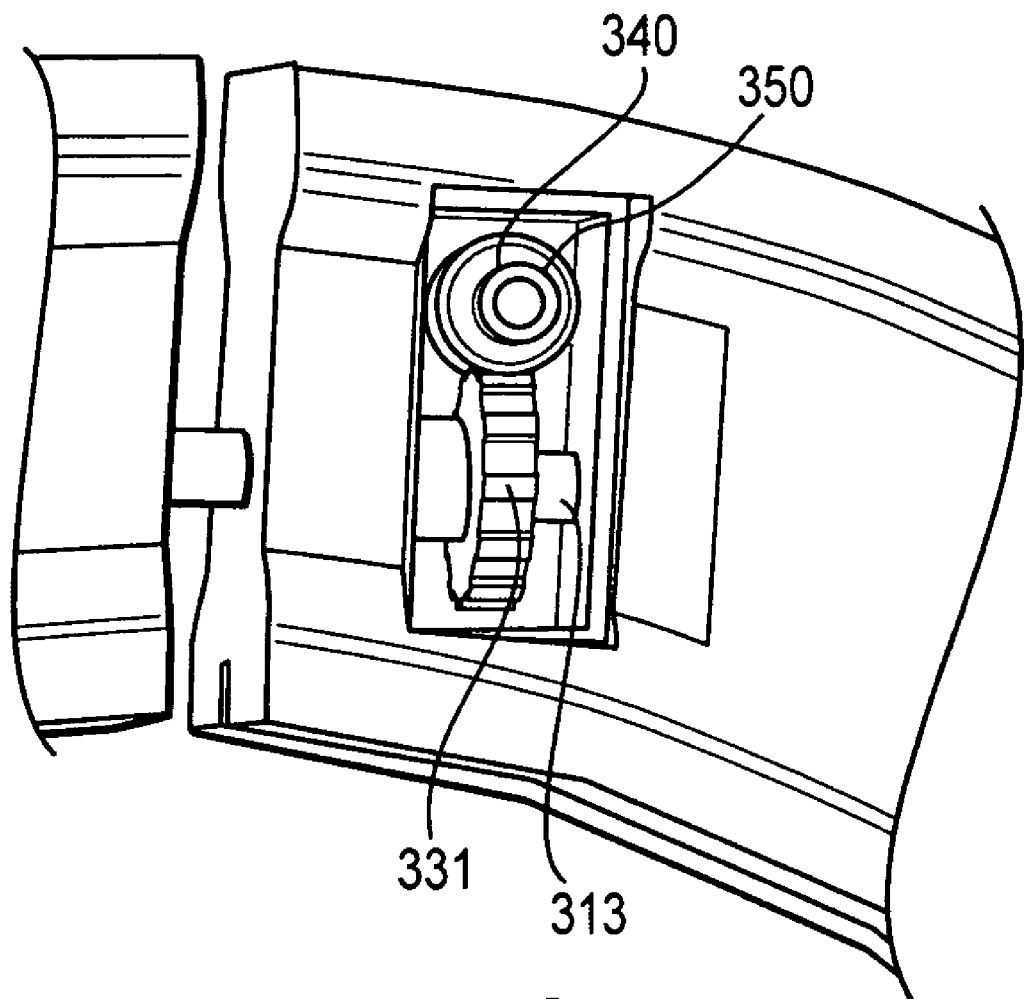
FIG. 9 is a schematic elevation view of the actuator portion of an attachment apparatus according to embodiments.

An exemplary embodiment is shown in FIGS. 4 and 7-9. FIG. 4 shows a pin 21 in the form of an eyebolt 310 with the translator 22, head 23, and converter 24 at an end opposite the eye of the bolt. The eyebolt can be replaced with a T-bolt or another suitable connecting bolt or pin. FIGS. 7-9 show additional details of the arrangement wherein threads 320 on the pin and in a pinion 330 act as the translator 22, and a worm 340 and the pinion teeth 331 are the converter 24. The head 24 can be a hex head 350 mounted on a shaft 360 about or on which the worm 340 is mounted. While a worm 340 is preferred, the worm 340 can be replaced with a helical gear or other toothed member that transfers motion from the head 24 to the pin 21 so as to allow the first and second portions 12, 13 of the insert 11 to be moved together and apart with little or no risk of reverse operation from stresses imparted during use of the insert 11. The actuator could further be replaced by engaging bevel gears, one rotated by the head, the other acting on the pin, by a face gear engaged by a pinion, or by another power train.

With reference to FIGS. 4 and 7-9, where an eyebolt 310 is used, it is mounted in a first portion 12 of the insert 10 on one side of a break 11, the eye portion 311 of the eyebolt being hooked over a post 312 or the like. The threads 320 include threads 321 formed on a portion of the shaft 313 of the eyebolt 310, and the threaded portion of the eyebolt 310 projects toward a second portion 13 of the insert on the other side of the break 11. Preferably, the threaded portion of the eyebolt is inserted into a bore 14 in the second portion 13 of the insert 10 and into a central bore 332 of a pinion mounted for rotation in the second portion 13. The pinion 330 of embodiments includes external teeth 331 about an external perimeter thereof and threads 333 on the surface of its central bore 332. The bolt shaft 313 is drawn into the second portion 13 when the pinion 330 is turned in one direction and is forced out of the second portion 13 when the pinion 330 is turned in an opposite direction. The actuator thus comprises the worm wheel 340 mounted in the second portion 13 and the head 24, 350 mounted on the end of the worm 340 or on the end of a shaft 360 about which the worm 340 is mounted for engagement and rotation with a tool. The teeth 341 of the worm 340 engage the teeth 331 of the pinion 330 to convert rotation of the head 24, 350 into translation of the pin 21 or the like, here eyebolt 310.

Figure 5:
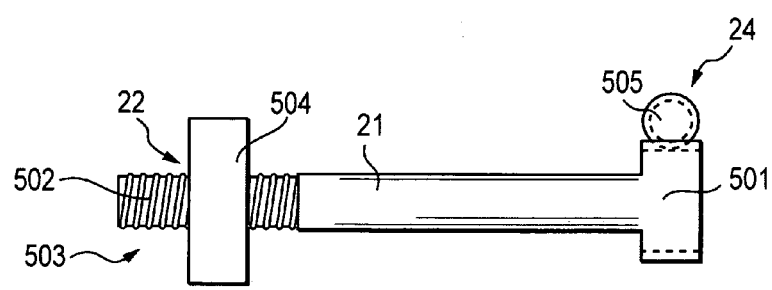
FIG. 5 is a schematic representation of another embodiment.

FIG. 5 shows an alternate arrangement in which the pin 21 has the translator 22 at one end and the head 23 and converter 24 at the other end. The pin 21 has a pinion 501 mounted on and for rotation with one end of the pin 21 in the second portion 13 of the insert 10. The pinion 501 could be mounted with a key on the pin 21, or the pin 21 and pinion 501 could be integrally formed as one piece, or another configuration could be used. The pin 21 further includes threads 502 on the end opposite the pinion. The threaded end 503 of the pin 21 is inserted through a threaded anchor 504 mounted in the first portion 12. The pinion 501 engages a toothed member 505, such as a worm, that is rotated by the head 23 so that rotation of the head 23 turns the toothed member 505. As the toothed member 505 turns, so does the pinion 501, which rotates the pin 21, causing translation of the pin 21 via the threads 502 engaging the anchor 504. Thus, the translator 22 includes the threads 502 and anchor 504, and the converter 24 includes the toothed member 505 and pinion 501. Again, while a worm is preferred, the toothed member 505 can be a helical gear or other toothed member that transfers motion from the head to the pin so as to allow the first and second portions of the insert to be moved together and apart with little or no risk of reverse operation from stresses imparted during use of the insert. The actuator could again be replaced by engaging bevel gears, one rotated by the head, the other acting on the pin, by a face gear engaged by a pinion, or by another power train.

Figure 6:
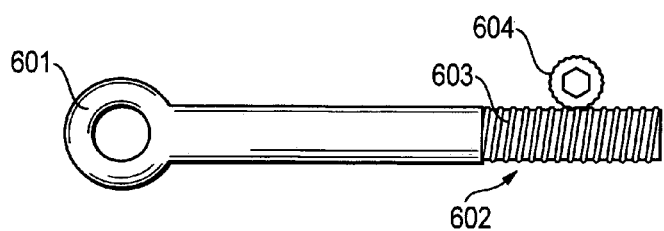
FIG. 6 is a schematic representation of another embodiment.

FIG. 6 shows an additional arrangement in which the pin 21 is similar to that of FIG. 4, but in which the converter 24 and translator 22 are combined. The pin 21 has a static anchor 601, such as an eye or T, at one end and a rack 602 of teeth 603 or the like at the other end. The rack 602 is engaged by a pinion 604 or the like that is rotated by rotation of the head 24. When the head 24 is turned, it rotates the pinion 604, which moves the rack 602, causing translation of the pin 21. The translator 22 and converter 24 both include the rack and pinion teeth in this variant.

Whatever form the actuator takes, whether it be a worm, pinion, or other mechanism, it is arranged to provide access to the head with a tool. For example, the worm of embodiments can be oriented so that its longitudinal axis is parallel to the rotational axis of the wheel on which the insert is mounted, while the pinion and bolt are mounted with their longitudinal axes parallel to a tangent of the insert/wheel. However, a parallel orientation of the worm axis is not optimal for access when a tire is mounted about the wheel and insert to be secured. Rather, as seen in the FIGS. and particularly in FIG. 15, an angle in the range of from about 0° to about 60° can provide better operation. In particular, an angle in the range of from about 10° to about 35° is effective, with an angle of about 20° being particularly effective. Similar ranges of angles are preferred for the axis of rotation of the pinion when the pinion directly receives rotation from the head and engages a rack on the bolt shaft.

Figure 13:
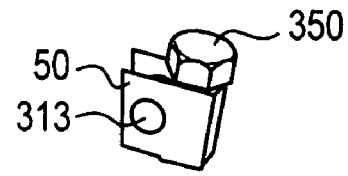
FIGS. 13 and 14 are schematic elevations showing the actuator portion before and after placement in an insert.
Figure 13:
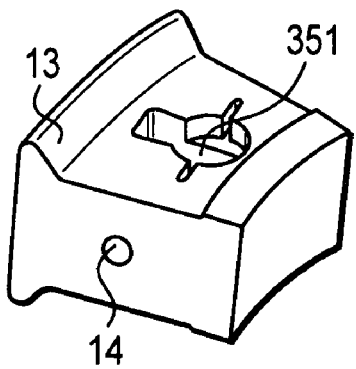
Figure 14:
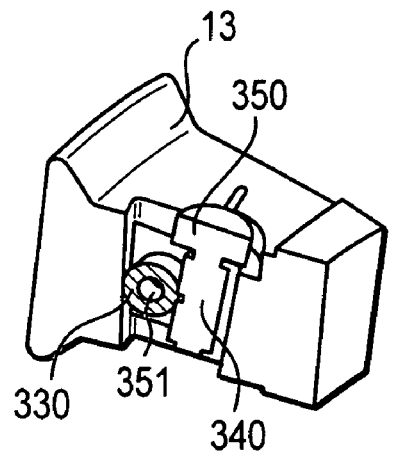
Figure 15:
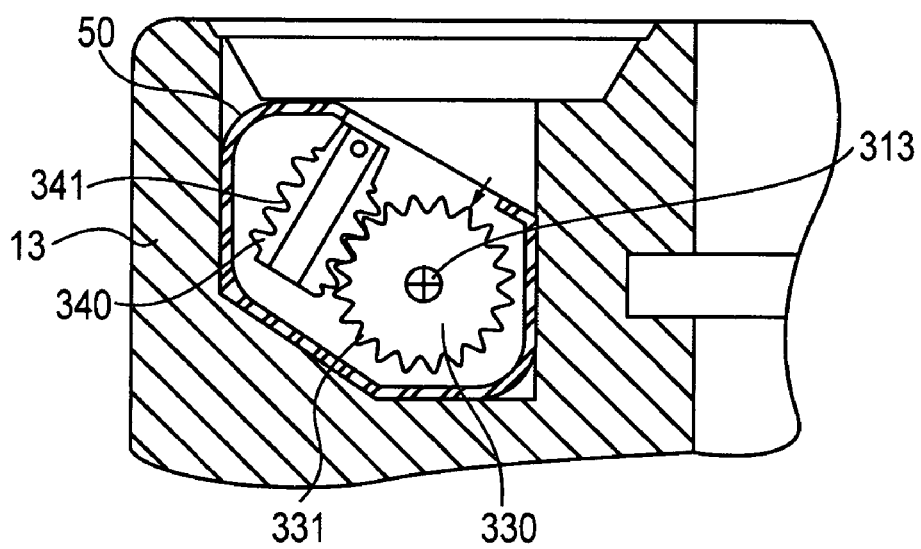
FIG. 15 is a cross-sectional schematic view of the actuator portion of embodiments illustrating a preferred angle at which the head should be mounted.

The actuator, converter, and translator can be encapsulated in their own housing 50, as seen in FIGS. 7-9, but particularly in FIGS. 13-15. Thus, embodiments include a housing 50 for the worm 340 and pinion 330, which housing can retain lubricant that reduces friction between the teeth 341, 331 of the worm 340 and the pinion 330. Alternative embodiments can include a housing that omits a wall or a portion of a wall, or even a housing that is integral with the tire insert. Embodiments in which a portion of a wall or an entire wall omitted will not retain lubricant within the housing permanently, but saves on materials costs and provides easier access to the worm. Where one or more walls are omitted, lubricant can be applied when the worm is to be used. In either alternative, the head protrudes beyond the housing to enable access with a tool. Preferably, the portion of the runflat insert in which the housing is mounted is molded to accommodate the tool engaging portion or head of the wheel and to allow engagement with the tool.

Figure 10:
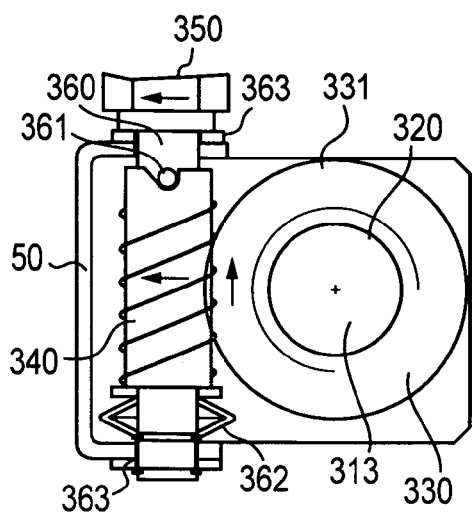
FIGS. 10-12 are schematic cross-sectional views of the actuator portion of embodiments and including a torque limiter in various states of operation.
Figure 11:
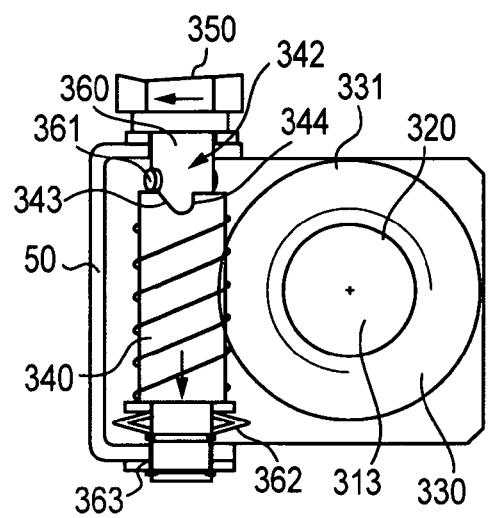
Figure 12:
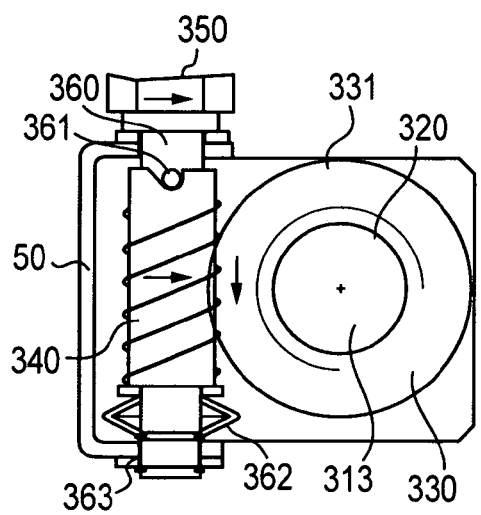

Embodiments can also include a torque limiting arrangement such that the insert and attachment apparatus can not be damaged by the application of too much torque to the head. In embodiments, as seen in FIGS. 10-12, the worm 340 is mounted about a bolt or shaft 360 on which the head 350 is formed. The worm 340 can slide along the shaft or bolt 360, but is limited in its motion on one end by one or more springs 362 mounted between the end of the worm and a wall in the second portion of the insert or wall of the housing in embodiments in which the apparatus is mounted in a housing. On the other end, the worm translation is limited by a pin 361 projecting from the shaft 360, the pin 361 engaging a notch 342 in the end of the worm 340. The notch 342 acts as a cam, and the pin 361 acts as a follower. The notch 342 includes a ramp 343 on the tightening side and the spring 362 presses the worm 340 against the pin 361 so that torque below a limit set by the spring load results in rotation of the worm 340 with the head 350 and shaft 360 when tightening the portions of the insert (drawing them together), but if the torque limit is reached, the pin 361 moves out of the notch 342 up the ramp 343 and the worm 340 can remain stationary. The loosening side of the notch 342 preferably does not include such a ramp, instead having a simple wall 344. To provide the spring bias, disc springs or the like are preferred as the spring(s) 362, though coil springs could also be used.

In operation, an installer places the insert about the wheel, inserts the shaft of the eyebolt into the bore and pinion, attaches a tool to the head on the worm, and rotates the head in the tightening direction. The worm is rotated by the head and turns the pinion, whose threads engage and rotate about the threads of the shaft of the eyebolt, drawing the eyebolt into the second section of the insert, which tightens the insert on the wheel. In embodiments including a torque limiter, when the design torque is reached, the torque limiter provides feedback to the installer so that he or she can stop rotating the head and remove the tool to proceed with the remainder of installation. In embodiments with no torque limiter, the design torque can be verified by the installer, such as by using a torque wrench or measuring a positional displacement.

Broadly, as described above, embodiments comprise a pin, a translator that acts on the pin to tighten and loosen the insert around the wheel, a head that can be rotated by a tool, and a converter that takes rotation of the head and transfers it into motion the translator can use. The particular locations of these components in the first and second portions of the insert can be changed as long as the components accomplish the functions they must to draw the portions together and secure the insert. In the embodiments shown in FIGS. 4 and 7-15, the pin is the shaft of an eyebolt mounted in the first portion of the insert. The translator is the combination of the threads on the shaft and the threads in the pinion. The converter is the worm and the teeth of the pinion, which take rotation of the head and convert it to rotation of the pinion about a different axis, which rotates the threads of the pinion about the eyebolt shaft, drawing the eyebolt into the second portion of the insert. To facilitate access, the axis of rotation of the head is inclined. In an alternative embodiment seen in FIG. 5, the translator can be threads on the end of the pin in the first section and engaging a threaded anchor in the first section. The other end of the pin carries a pinion with external teeth, the pin rotating with the pinion. The external teeth of the pinion engage the worm such that rotation of the head rotates the worm, rotating the pin, causing translation via the threads. The axis of rotation of the worm would be in the range discussed for the worm embodiment above. In another embodiment seen in FIG. 6, the translator can be a rack on the pin engaged by teeth of a pinion rotated directly by the head, though this arrangement would be reversible and would require a locking mechanism or the like to prevent spontaneous loosening of the insert during use. Additionally, this alternative embodiment would have the axis of rotation of the pinion in the range discussed for the worm embodiments above.

It will be appreciated that various of the above-disclosed and other features and functions, or alternatives thereof, may be desirably combined into many other different systems or applications. Also, it will be understood that various presently unforeseen or unanticipated alternatives, modifications, variations or improvements therein may be subsequently made by those skilled in the art which are also intended to be encompassed by the following claims

What is claimed is:

1. A runflat insert attachment and adjustment apparatus comprising:
a pin secured in and extending from one of a first and second portion of the insert to another of the first and second portion of the insert;
a translator mounted in one of the first and second portions of the insert and configured to move the pin to selectively tighten and loosen the insert about a wheel;
a head arranged for engagement and rotation by a tool;
a converter connected to the head and the translator and configured to receive rotation of the head and transfer it to the translator in a form the translator can use;
wherein a shaft portion of the pin carries threads and is engaged and selectively translated by a portion of at least one gear;
wherein the at least one gear comprises a worm and a pinion, the pinion further comprising external teeth and a threaded central bore that together with the threads of the shaft portion comprises the translator, the worm and pinion teeth comprising the converter;
a second shaft about which the worm is slidably and rotatably mounted, the second shaft supporting the head for rotation therewith; and
a second pin projecting radially from the second shaft and engaging a notch in a first end of the worm, at least one spring engaging a second end of the worm and biasing the worm toward the second pin, the notch comprising a ramp on a tightening side so that the worm rotates with the second pin until torque applied to the head exceeds a restraining force imposed on the second pin by the bias.

2. The apparatus of claim 1 wherein the head is mounted on the second shaft.

3. The apparatus of claim 1 wherein the pin comprises an eyebolt with an eye portion and the shaft portion, the eye portion of the eyebolt being hooked over a post formed in the one of the first and second portions of the insert.

4. The apparatus of claim 1 wherein the other of the first and second portions of the insert comprises a bore into which the shaft portion of the pin can be inserted.

5. The apparatus of claim 1 wherein the external teeth of the pinion engage teeth of the worm such that rotation of the worm causes rotation of the pinion.

6. The apparatus of claim 1 further comprising an eyebolt, and a pinion connected to the head, the eyebolt including an eye and a first shaft and comprising the pin, the first shaft further comprising a rack portion with teeth, the pinion further comprising external teeth that together with the rack comprises the translator and the converter.

7. A runflat tire insert attachment and adjustment apparatus comprising:
a pin in a first portion of an insert and arranged to extend into a second portion of the insert, an actuator in the second portion of the insert and engaging the pin, a head of the actuator having a rotational axis in a plane substantially transverse to a diametral plane of the insert, and a torque limiter between the head and the actuator.

8. The apparatus of claim 7 wherein the pin comprises threads operatively engaged in the second portion of the insert by the actuator when the insert is placed on a wheel, the actuator selectively drawing the pin into and forcing the pin out of the second portion of the insert via the threads.

9. The apparatus of claim 8 wherein the actuator comprises a pinion mounted in the second portion of the insert with a rotational axis coaxial with a longitudinal axis of the pin, the pinion operatively engaging the pin via threads on an internal surface of the pinion.

10. The apparatus of claim 9 further comprising a worm mounted with a rotational axis substantially perpendicular to the rotational axis of the pinion and including teeth, the worm teeth engaging external teeth of the pinion.

11. The apparatus of claim 10 wherein the head is mounted on a shaft about which the worm is mounted and configured for access by and use with a tool, rotation of the head inducing rotation of the worm.

12. The apparatus of claim 7 wherein the pin comprises teeth in a rack operatively engaged in the second portion of the insert by the actuator when the insert is placed on a wheel, the actuator selectively drawing the pin into and forcing the pin out of the second portion of the insert via the teeth.

13. The apparatus of claim 12 wherein the actuator comprises a pinion mounted in the second portion of the insert with a rotational axis substantially perpendicular to the diametral plane of the insert, the pinion operatively engaging the pin via teeth on an external surface of the pinion.

14. The apparatus of claim 13 wherein the head is on a shaft about which the pinion is mounted and configured for access by and use with a tool, rotation of the head inducing rotation of the pinion.

15. A runflat tire insert attachment and adjustment apparatus comprising:

a pin in a first portion of an insert and arranged to extend into a second portion of the insert;

an actuator in the second portion of the insert and engaging the pin, a head of the actuator having a rotational axis in a plane substantially transverse to a diametral plane of the insert; and a torque limiter between the head and the actuator, wherein the torque limiter comprises a cam mounted about a shaft, the shaft having a follower projecting radially therefrom, the follower engaging a cam, the cam and follower being forced together by a spring bias that induces a retention force such that when torque applied to the head exceeds the retention force, the follower rotates ahead of the cam, thereby preventing damage to the cam, actuator, and pin.

* * * * *